United States Patent
Grinrod et al.

(10) Patent No.: US 10,745,607 B2
(45) Date of Patent: Aug. 18, 2020

(54) BIODEGRADABLE ADDITIVE SUITABLE FOR USE IN WELLBORE FLUIDS

(71) Applicant: Schlumberger Norge, AS, Hafrsfjord (NO)

(72) Inventors: Anders Grinrod, Stavanger (NO); Beathe Pettersen, Stavanger (NO); Anne Fosse, Sandnes (NO)

(73) Assignee: Schlumberger Norge AS, Stavanger (NO)

( * ) Notice: Subject to any disclaimer, the term of this patent is extended or adjusted under 35 U.S.C. 154(b) by 0 days.

(21) Appl. No.: 15/666,567

(22) Filed: Aug. 2, 2017

(65) Prior Publication Data

US 2018/0037802 A1    Feb. 8, 2018

Related U.S. Application Data

(60) Provisional application No. 62/370,336, filed on Aug. 3, 2016.

(51) Int. Cl.
    *C09K 8/12*    (2006.01)
    *C09K 8/508*   (2006.01)

(52) U.S. Cl.
    CPC .............. *C09K 8/5086* (2013.01); *C09K 8/12* (2013.01)

(58) Field of Classification Search
    CPC ...... C09K 8/68; C09K 8/508; C09K 2208/24; C09K 8/88; C09K 8/512; C09K 8/685; C09K 8/887; C09K 2208/08; C09K 8/035; C09K 8/12; C09K 8/92; C09K 8/487; C09K 8/516; C09K 8/70; C09K 8/5086; C09K 8/885; C09K 2208/10; C09K 2208/18; C09K 2208/26; C09K 8/38; C09K 8/40; C09K 8/467; C09K 8/72; C09K 8/74; C09K 8/80; C09K 8/905; C09K 2208/12; C09K 2208/30; C09K 2208/34; C09K 8/02; C09K 8/03; C09K 8/032; C09K 8/04; C09K 8/08; C09K 8/20; C09K 8/22; C09K 8/24; C09K 8/32; C09K 8/34; C09K 8/36; C09K 8/424; C09K 8/426; C09K 8/44; C09K 8/46; C09K 8/48; C09K 8/50; C09K 8/502; C09K 8/5083; C09K 8/528; C09K 8/60; C09K 8/62; C09K 8/706; C09K 8/725; C09K 8/76; E21B 2034/005; E21B 23/00; E21B 33/12; E21B 33/134; E21B 34/00; E21B 34/063; E21B 43/08; E21B 21/003; E21B 43/25; E21B 43/26; E21B 43/267; E21B 21/00; E21B 21/002; E21B 33/13; E21B 33/138; E21B 33/14; E21B 43/16
    See application file for complete search history.

(56) References Cited

U.S. PATENT DOCUMENTS

| | | | | |
|---|---|---|---|---|
| 2009/0253593 A1* | 10/2009 | Adda | ................... | C09K 8/05 507/145 |
| 2010/0256018 A1 | 10/2010 | Ezell et al. | | |
| 2011/0048716 A1* | 3/2011 | Ezell | ................... | C09K 8/12 166/300 |
| 2015/0027703 A1* | 1/2015 | Zhu | ................... | C09K 8/68 166/280.2 |
| 2016/0201442 A1 | 7/2016 | Gullickson et al. | | |

FOREIGN PATENT DOCUMENTS

| | | |
|---|---|---|
| WO | 2015/013112 A1 | 1/2015 |
| WO | 2015/152754 A1 | 10/2015 |
| WO | 2017/048625 A1 | 3/2017 |

OTHER PUBLICATIONS

Office Action for the equivalent Norwegian patent application 20171297 dated Jun. 21, 2019.
Amara, "Polyhydroyalkanoates: From Basic Research and Molecular Biology to Application," IUM Engineering Journal, vol. 9, No. 1, 2008, pp. 37-73.
Combined Search and Examination Report for 1712480.1 dated Feb. 2, 2018.
Office Action for the equivalent Norwegian patent application 20171297 dated Mar. 16, 2018.

* cited by examiner

*Primary Examiner* — Kumar R Bhushan

(57) ABSTRACT

A wellbore fluid comprising an aqueous base fluid and a plurality of particles of a polyhydroxyalkanoate latex polymer having the formula: $[\text{—O—CHR—(CH}_2)_m\text{—CO—}]_n$, wherein m is a value ranging from 1 to 10 and n is a value equal to or less than 20000.

9 Claims, 5 Drawing Sheets

BIODEGRADABLE ADDITIVE SUITABLE FOR USE IN WELLBORE FLUIDS

CROSS REFERENCE TO RELATED APPLICATIONS

This application claims the benefit of priority to U.S. Provisional Patent Application Ser. No. 62/370,336, filed on Aug. 3, 2016, the entire content of which is incorporated herein by reference.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

However, for a wellbore fluid to perform its functions and allow wellbore operations to continue, the fluid must stay in the borehole. Frequently, undesirable formation conditions are encountered in which wellbore fluids may be lost to the formation. For example, wellbore fluids may leave the borehole through large or small fissures or fractures in the formation or through a highly porous rock matrix surrounding the borehole. Thus, fluid loss or lost circulation is a recurring drilling problem, characterized by loss of wellbore fluids into downhole formations that are fractured, highly permeable, porous, cavernous, or vugular. Other problems encountered while drilling and producing oil and gas include stuck pipe, hole collapse, loss of well control, and loss of or decrease in production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid that includes an aqueous base fluid and a plurality of particles of a polyhydroxyalkanoate latex polymer having the formula: $[-O-CHR-(CH_2)_m-CO-]_n$, wherein m is a value ranging from 1 to 10 and n is a value equal to or less than 20000.

In another aspect, embodiments of the present disclosure relate to a method that includes emplacing a wellbore fluid into a wellbore through an earthen formation, where the wellbore fluid includes an aqueous base fluid; and a plurality of particles of a polyhydroxyalkanoate latex polymer having the formula:

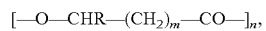

$[-O-CHR-(CH_2)_m-CO-]_n$, wherein m is a value ranging from 1 to 10 and n is a value equal to or less than 20000.

Other aspects and advantages of the claimed subject matter will be apparent from the following description and the appended claims.

DETAILED DESCRIPTION

Figure 1:
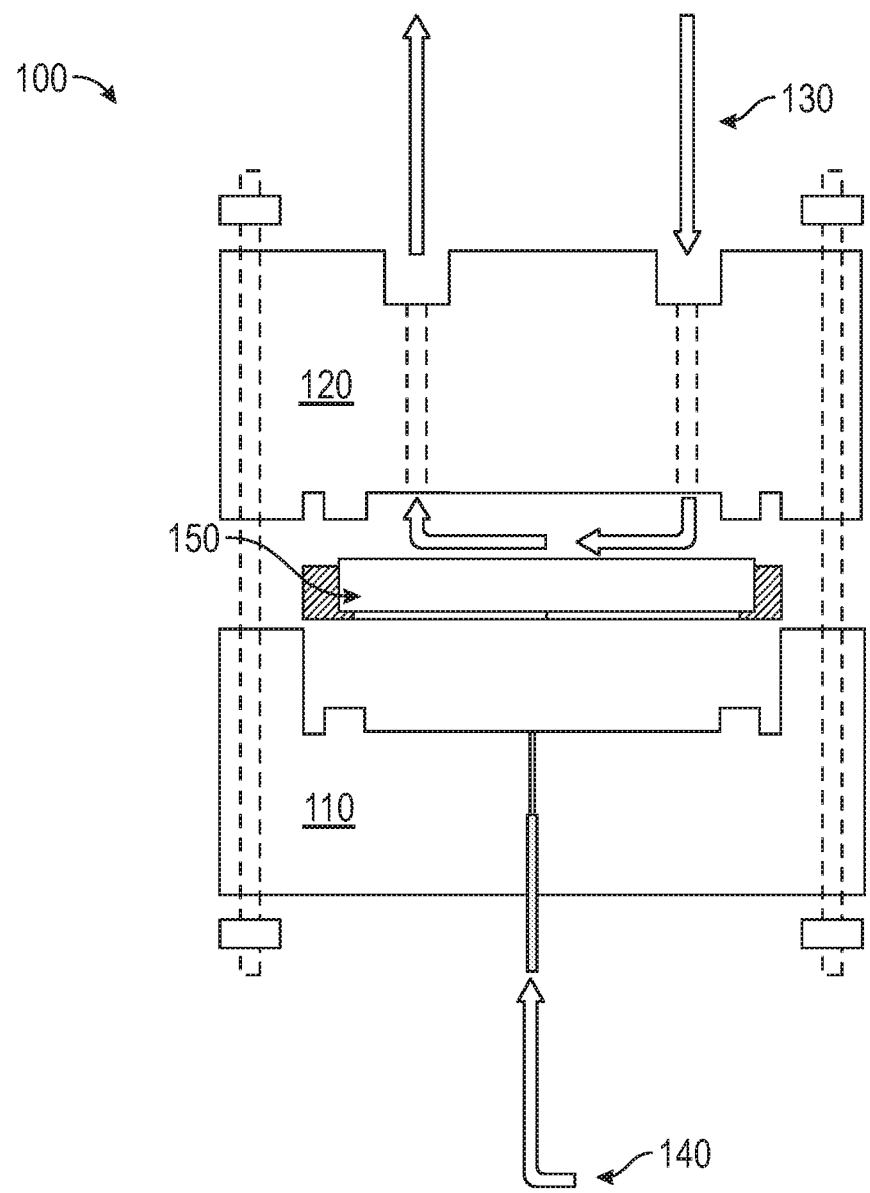
FIG. 1 illustrates a schematic diagram of the Shale Membrane Test (SMT) apparatus, according to the present embodiments.

Generally, embodiments disclosed herein relate to wellbore fluids including biodegradable polymers and methods of using the same. More specifically, embodiments disclosed herein relate to wellbore fluids for downhole applications formed of an aqueous base fluid and a plurality of particles of a polyhydroxyalkanoate (PHA) latex polymer. The inventors of the present disclosure have found that particles of polyhydroxyalkanoate latex polymers dispersed in an aqueous base fluid may be incorporated into a wellbore fluid to strengthen sections of a wellbore, to combat borehole instability and increase risks of collapse that may occur when operating in fracture prone formations including shale, or in unconsolidated formations. Wellbore strengthening may minimize or reduce the risk of lost fluid circulation and may be used to improve zonal isolations and sealing applications. In addition, the polyhydroxyalkanoate latex polymers of the present disclosure may be used as wellbore stabilization agents in environmentally sensitive areas such as the North Sea, as they are biodegradable and environmentally friendly compared to conventional latexes which are poorly biodegradable and recalcitrant.

As used herein, the term "environmentally friendly" is defined as chemicals or formulations that can pass the most stringent environmental testing criteria as described below. Furthermore, as used herein, the term "environmentally unfriendly" is defined as chemicals or formulations that do not pass the most stringent environmental testing criteria. Specifically, one measure of sample toxicity is marine biodegradation data as outlined in Organization for Economic Cooperation and Development, Procedure OECD 306 or BODIS. Under OECD 306, the rules governing offshore chemical use set forth three tests: bioaccumulation, biodegradation and toxicity. In order for a chemical to be used without restriction offshore in the North Sea it must satisfy two of the following three criteria: (1) biodegradation is greater than 60%, if less than 20% it is automatically marked for substitution; (2) bioaccumulation as measured by octanol/water partitioning coefficient (log Po/w) is below 3 (or have a molecular weight>700); and (3) toxicity to the most sensitive marine species (often Skeletonema) is greater than LC50 or EC50 of 10 ppm. In order to comply with these constraints, components of the wellbore fluids in some embodiments may be selected such that they meet the requirements for biodegradation and aquatic toxicity. At present (and for the last 30 years), the geographic location with the most stringent environmental and discharge testing criteria for well treatment operation is the North Sea, but the definition of either of these terms should in no way be limited to any past, present or future North Sea environmental testing criteria. Further, the test criteria also in no way limit the geographical region of use of the fluid, but provides an indication of the environmental friendliness of a product (or fluid containing a product).

As solutions are found useful to provide certain functions in treatment fluids, when used in the North Sea off shore, or other highly regulated off shore environments, stringent requirements for particular off shore environments are met. Any oilfield chemical that is used in the North Sea is registered with the respective country's regulatory body which assigns a rating or color classification to each chemical depending on its environmental and toxicological characteristics. Based on the chemical rating or color classification, the chemical will either be regarded as more or less environmentally friendly or unfriendly. In the North Sea, the classification techniques vary. For example, Norway and Denmark follow color classification for chemical products, United Kingdom (UK) follows color and letter ratings for organic and inorganic chemical products, respectively, and Netherlands follows letter categories. Thus, countries within a small geographic region have customized their classification system based upon a desire to differentiate environmentally friendly and unfriendly chemical products. Regardless of the classification system, each of the North Sea countries (Norway, Denmark, Netherlands and United Kingdom) employs the same three ecotoxicology tests criteria, as described above, to differentiate chemical products.

When each component in a chemical product passes the above mentioned criteria, then the whole product is rated as "Green" or PLONOR (Pose Little Or NO Risk) in Norway and Denmark. When one of the components only meets two of the criteria, then the product can receive "Yellow" classification in Norway and Denmark, but it is still environmentally friendly. If the biodegradation in seawater is <20% after 28 days for any of the components, then the chemical products receive "Red" classification or substitution warning (i.e., environmentally unfriendly classification in the North Sea). Table 1, below, summarizes the North Sea regulations. As a rule of thumb, two or more "Good" results means that the chemical compounds are acceptable, while two or more "Bad" results means that the chemical compound is unacceptable. However, a chemical compound having less than 20% biodegradation alone is unacceptable. Depending on the service performed, a well service operation may involve a large amount of chemicals, which means that the introduction of environmentally friendly chemicals may be mandatory.

TABLE 1

North Sea Regulations Interpretation

| | Test | | | | | | |
|---|---|---|---|---|---|---|---|
| | Biodegradation | | | Bioaccumulation Unit | | Toxicity - EC/LC50 | |
| | % | | | Log Pow | | mg/L | |
| Result | <20 | 20-60 | >60 | <3 | >3 | <10 | >10 |
| Inference | Very bad | Bad | Good | Good | Bad | Bad | Good |

According to the present embodiments, the wellbore fluids of the present disclosure may contain polyhydroxyalkanoate (PHA) latex polymers that may aid in controlling fluid loss and strengthen unconsolidated or poorly consolidated sections in a wellbore. As defined herein, latex is a stable dispersion (emulsion) of polymeric micro particles in an aqueous medium. Traditional, synthetic latex products are made by polymerizing monomers that have been emulsified with surfactants. PHA latex is made using an unconventional method based on microbial fermentation followed by high shear dispersion. Upon filtration, the latex particles coalesce to form a film/structure in the filter cake or in the microfractures, acting as a sealing additive.

Prior to addition to a wellbore fluid, PHA latex polymers in accordance with the present disclosure may be in solid particulate form having properties similar to a thermoplastic. In one or more embodiments, the PHA latex polymers of the present disclosure may have a particle size distribution $d_{50}$ of less than 1500μ. Polyhydroxyalkanoate latex polymers as described herein may show strong adherence to formations and may generate a filter cake. According to various embodiments, the PHA latex polymers as described herein may be present in sufficient concentration to provide wellbore consolidation downhole. Generally, the PHA latex polymers of the present disclosure may be added to a wellbore fluid in a concentration that ranges from about 0.1 wt % to about 20 wt % of the weight of the wellbore fluid, where the lower limit can be any of 0.1 wt %, 0.5 wt %, 1 wt %, 1.5 wt % or 2.5 wt % and the upper limit can be any of 10 wt %, 12 wt %, 15 wt %, 18 wt % or 20 wt %, where any lower limit can be used with any upper limit.

Polyhydroxyalkanoate polymers, represented by formula 1, shown below, are widely distributed within different microbial species and are accumulated intracellularly in the form of storage granules.

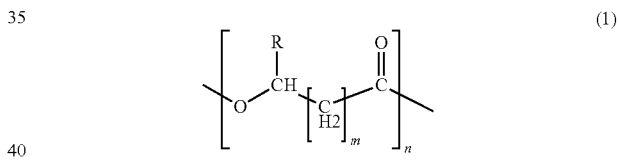

(1)

As shown in formula 1 above, R represents a radical, m represents the number of methylene groups, —$CH_2$—, and n represents the repeating unit. The radical R may be saturated, unsaturated, aromatic, epoxidized, halogenated or a branched monomer. The number of methylene groups, m, may vary from about 1 to about 10. Like any polymer, polyhydroxyalkanoate polymers are chains of monomers repeating as either a homopolymer or heteropolymer. The molecular weights of polyhydroxyalkanoate polymers represented by formula 1 may vary from about 100 to about 30,000. In general, the composition of a polyhydroxyalkanoate polymer, and implicitly its properties, depends on its synthesis, the carbon source and the metabolic routes involved. For example, the polyhydroxyalkanoate latex polymers as described herein are biopolymers made by corn sugar fermentation with proprietary genetically engineered bacteria. Due to their physical properties, polyhydroxyalkanoate latex polymers may be considered bioplastics.

In one or more embodiments, polyhydroxyalkanoate latex polymers are polyhydroxyalkanoate polymers composed of 3-hydroxy alkanoic acid or 3-hydroxy alkanoate monomers units, each unit forming an ester bond with the hydroxyl group of the other one. The general formula of a poly (3-hydroxy alkanoate) is shown below:

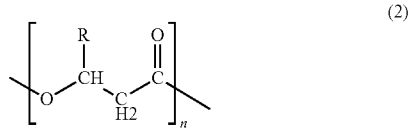

$$(2)$$

where R represents a radical, and n represents the repeating unit. Generally, the hydroxyl-substituted carbon atom has R configuration. For example, as described later in more detail, at the $C_3$ atom (β position), an alkyl group, R, which length may vary from methyl ($C_1$) to tridecyl ($C_{13}$), may be located as shown in formula 2. The value of n may be a factor in the ability of a PHA latex polymer to carry out its desired role, such as to generate strong filter cakes. The value of n may be a number that reflects the average molecular weight of the compound. In one embodiment of the present disclosure n may have a value that ranges from about 100 to about 20000, where the lower limit can be any of 100, 500, 1000, 2000 and the upper limit can be any of 3500, 5000, 10000 or 20000, where any lower limit can be used with any upper limit. In another embodiment of the present disclosure, the value of n is determined by the molecular weight of the PHA latex polymer, for a given radical selected. However, regardless of how a particular value of n is selected, the PHA latex polymers may function as intended in the wellbore fluid and may minimize any impact it might have on the other properties of the wellbore fluid.

Some nonlimiting examples of suitable PHA latex polymers are presented in Table 2. The PHA latex polymers that have shown particular utility in the present disclosure are selected from poly (3-hydroxy alkanoates) where R is selected from the group of alkyl radicals. In such embodiments, the number of carbon atoms in the R radical may be equal to or less than 13.

TABLE 2

| R group | Total number of carbon atoms in the monomer unit | PHA polymer |
|---|---|---|
| methyl | $C_4$ | Poly (3-hydroxybutyrate) |
| ethyl | $C_5$ | Poly (3-hydroxyvalerate) |
| propyl | $C_6$ | Poly (3-hydroxyhexanoate) |
| butyl | $C_7$ | Poly (3-hydroxyheptanoate) |
| pentyl | $C_8$ | Poly (3-hydroxyoctanoate) |
| hexyl | $C_9$ | Poly (3-hydroxynonanoate) |
| heptyl | $C_{10}$ | Poly (3-hydroxydecanoate) |
| octyl | $C_{11}$ | Poly (3-hydroxyundecanoate) |
| nonyl | $C_{12}$ | Poly (3-hydroxydodecanoate) |
| decyl | $C_{13}$ | Poly (3-hydroxytridecanoate) |
| undecyl | $C_{14}$ | Poly (3-hydroxytetradecanoate) |
| dodecyl | $C_{15}$ | Poly (3-hydroxypentadecanoate) |
| tridecyl | $C_{16}$ | Poly (3-hydroxyhexadecanoate) |

According to various embodiments, the PHA latex polymers of the present disclosure may be dispersed in an aqueous base fluid. The polyhydroxyalkanoate latex polymers of the present disclosure may act as a wellbore stabilization agent, enhancing wellbore consolidation downhole. For example, as noted above, they may generate a filter cake on the walls of a wellbore that prevents or reduces fluid flow in or out of the wellbore, and increases the mechanical stability of the near-wellbore formation in treated intervals. Reinforced filter cakes may prevent damage that occurs for example during drilling operations such as when passing a drill string through narrow boreholes, and may mitigate the risk of pack-offs occurring while removing drill strings and other equipment. According to various embodiments, the wellbore stabilizing chemistry using PHA latex polymers as described herein may exhibit the following properties and effects: a) minimization of losses in fractured formations; b) hydraulic blocking of micro-fractured shale; c) provision of a mechanically strong filter cake in permeable formations; d) good adhesion of filter cake to permeable formation; e) reduction in borehole collapse potential, particularly upon POOH (pulling out of hole); f) continuously present in the drilling fluid during circulation; g) good temperature stability, withstands exposure to elevated temperatures; h) environmentally acceptable, being biocompatible and biodegradable without any toxicity; i) no negative effect on drilling fluid properties. For example, the PHA latex polymers of the present disclosure do not increase the viscosity profile of the drilling fluid, as well as do not negatively impact the drilling fluids clay inhibition level.

According to various embodiments, the wellbore fluids of the present disclosure may include a coalescing agent which may provide film forming properties at lower temperatures. For example, in one or more embodiments, the coalescing agent may be present in the wellbore fluid in an amount that ranges from about 0.05 wt % to about 5 wt %. The coalescing agent may be selected from the group of glycerides, triglycerides, alcohols and esters. For example, in one embodiment, the coalescing agent is tributyrin (tributyl ester of glycerol). In such embodiment, the synergism between a PHA latex and trybutyrin may result in a high potential for formation stabilization.

One of the optional components of the wellbore fluids of this disclosure is a plasticizer which can be added to the wellbore fluid to reduce the modulus of the polymer at the use temperature by lowering its glass transition temperature (Tg). This may allow control of the viscosity and mechanical properties of the composition. For example, wellbore fluids of the present disclosure may include an acetic acid derivative plasticizer, such as for example triacetin. Other plasticizers may include a citric acid derivative plasticizer, wherein at least one of the carboxylic acid functional groups of the citric acid nucleus is esterified with a $C_1$ to $C_{12}$ alcohol, and wherein the hydroxyl group of the citric acid nucleus is unfunctionalized or esterified with a $C_1$ to $C_{12}$ carboxylic acid. In some embodiments, citric acid derivative plasticizers may include tributyl citrate esters, acetyl-tri-n-hexyl citrate, acetyl-tri-n-hexyl citrate, acetyl-tri-n-octyl citrate, acetyl-tri-n-decyl citrate, acetyl tributyl citrate, acetyl trihexyl citrate, butyryl trihexyl citrate esters. It is also envisioned that other conventional plasticizers may be used depending on the application and environmental requirements, for example.

As noted above, wellbore fluids may be formulated by dispersing particles of a PHA latex polymer of the present disclosure in an aqueous base fluid. In various embodiments, the aqueous base fluid may generally be any water base fluid phase. In one or more embodiments, the aqueous base fluid may be selected from fresh water, sea water, brines (e.g., a saturated salt water or formation brine), mixtures of water or brine and water-soluble organic compounds, or mixtures thereof. In those embodiments of the disclosure where the aqueous medium is a brine, the brine may include water and an inorganic salt or an organic salt. The salt may serve to provide a portion of the fluid's density (to balance against the formation pressures), and may also reduce the effect of the water based fluid on hydratable clays and shales encountered during completion. In various embodiments, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution.

The wellbore fluids of the present disclosure may also include additional components, such as weighting agents, fluid loss control agents, bridging agents, lubricants, penetration rate enhancers, defoamers, anti-bit balling agents, corrosion inhibition agents, surfactants, viscosifiers, inhibitors (such as accretion inhibitors) and suspending agents and the like. Such compounds should be known to one of ordinary skill in the art of formulating wellbore fluids.

Upon mixing, the fluids of the present embodiments may be used in wellbore operations, such as drilling operations. Such operations are known to persons skilled in the art and involve pumping a drilling fluid into a wellbore through an earthen formation. The fluids of the present embodiments may have particular application for enhanced wellbore consolidation downhole. In addition, as noted above, such fluids are stable, while maintaining a favorable environmental rating.

One embodiment of the present disclosure includes a method that involves emplacing a wellbore fluid into a wellbore through an earthen formation. In a particular embodiment, the wellbore fluid may incorporate an aqueous base fluid and a plurality of particles of a PHA latex polymer having formula (1), where, as noted above, m is a value ranging from about 1 to about 10 and n ranges from about 100 to about 20000. Such wellbore operations may include, but are not limited to drilling.

Upon introducing a wellbore fluid of the present disclosure into a borehole, a filter cake may be formed which provides an effective sealing layer on the walls of the borehole preventing undesired invasion of fluid into the formation through which the borehole is drilled. Filter cakes formed from wellbore fluids disclosed herein may exhibit properties such as pressure blockage, reliability of blockage, and increased range of formation pore size that can be blocked.

Where the formation is a low permeability formation such as shales or clays, the filter cakes formed using the wellbore fluids and methods of the present disclosure prevent wellbore fluid and filtrate loss by effectively blocking at least some of the pores of the low permeation formation. This may allow for support of the formation by maintaining sufficient pressure differential between the wellbore fluid column and the pores of the wellbore. Further, the filter cakes formed by wellbore fluids of the present disclosure may effectively seal earthen formations, and may be stable at elevated temperatures.

EXAMPLES

The following examples are presented to further illustrate the properties of various wellbore fluids formulated with PHA latex polymer in accordance with the present disclosure, and should not be construed to limit the scope of the disclosure, unless otherwise expressly indicated in the appended claims. Specifically, fluid formulations according to the present disclosure were tested according to the following: a) viscosity before heat rolling (BHR) and at 0, 20, 50 and 80° C. after heat rolling (AHR) for 16 hours; b) API and HTHP fluid loss control; c) adherence of filter cake towards ceramic 10 micron disc; d) inhibition testing towards highly dispersive clay (accretion, cuttings hardness and dispersion); e) foam/trapped air measurement; f) contamination tolerance towards cement, seawater and drill solids; g) static sag stability after 1 and 3 days; h) pH. Some of the methods used for testing were according to API recommended practice, and other methods were developed particularly for evaluating a specific property of a product. The test temperature was set to 100° C. for the initial part of the project. For the concept validation phase the testing was performed AHR at temperatures of 40° C. and 80° C.

Filtration

The HTHP Filter Press testing is used for screening products with respect to reducing fluid loss, and to evaluate the quality and the mechanical property of the filter cake. Filtration is considered a principal activation mechanism in permeable formations, and therefore the screening was largely based on this test method.

Low pressure is assumed to be the worst case scenario for filter cake deposition, as higher pressure is assumed to yield increased transport of particles into pores and fractures. The lowest over pressure for the applications is estimated to 500 psi, hence 500 psi is recommended as a differential pressure for filtration tests. To accommodate various types of formations, inert media like ceramic discs are selected as filtration media. The 10 μm disc is the lowest pore size available. According to the well conditions of the selected applications, the HTHP Filter Press test conditions were: ceramic disc: 10 μm (old designation: 3 μm); differential pressure: 500 psi; temperature: 100° C.; test period: 2 hours.

Manual Scratch Test

The test allows for simple and fast screening of the PHA latex based sealants gluing and strengthening effects of the filter cake. The filter cake is produced according to standard HTHP filter press procedure. For evaluation at elevated temperatures, the hot HTHP filter cell is disassembled immediately after the filtration time ends. The filter cake is qualitatively evaluated based on its adherence to the disc of the cake when scratching it off the disc with a small spatula. The adherence of the filter cake is graded according to the criteria in Table 3.

TABLE 3

| Adherence of filter cake Cake Adherence | |
| --- | --- |
| No adherence | 0 |
| Low adherence | 1 |
| Medium adherence | 2 |
| Strong adherence | 3 |
| Very strong. Non removable film | 4 |

Disc Adhesion Strength Test (DAST)

The Disc Adhesion Test (DAST) is an in-house developed method for the evaluation of the adhesive properties of the filter cake towards various media, such as sandstone, shale and other materials. Good adhesive properties of the filter cake are thought to be particularly relevant where pressure fluctuations are encountered such as in a POOH (pulling out of hole) situation. The DAST test is based on how much force is required to pull off a piece of rock that is placed on top of a filter cake. The test is carried out according to a three stage procedure: firstly, a standard HTHP filtration of the relevant fluid is carried out to build a filter cake on a disc; secondly, the HTHP cell is opened and a disc shaped piece of the relevant material is placed on top of the filter cake and further filtration is carried out. Thirdly, the cell is removed from the heating jacket and placed in a custom-made apparatus for measuring the force needed to remove the disc from the filter cake. The pull force is applied in a direction normal to the plane of the filter cake.

Fracture Slot Test

The Fracture Slot Test is a test used for evaluation of plugging and sealing compared to standard testing on slotted steel discs. The test was performed to evaluate PHA latex polymers used as sealing additives, as described herein, with LCM plugging materials for fractures of various widths (200 μm-2000 μm). The test relies on filtration from wellbore to formation direction from 30 minutes up to 2 hours at temperature from 25 to 100° C.

Shale Membrane Test (SMT)

Generally, the SMT evaluates the efficiency of a compound in sealing a micro-fractured shale. A schematic diagram of the used SMT apparatus is shown in FIG. 1. The parameter that is measured is pressure transmission over a piece of shale sample 150. The shale sample 150 is molded into an epoxy potting compound and subsequently sliced to expose the shale surface. The thickness of the shale sample 150 is typically ¼ in and its geometry is quadratic (1 inch on the sides). The epoxy embedded shale sample is thereby placed into a cell 100, where the test fluid 130 is flowed on the top of the sample at a controlled rate and pressure (300 psi). The cell 100 has a base 110 and a top cap 120. The sample 150 is also pressurized on the bottom side as indicated by 140. Differential pressure is typically 250 psi. The current testing is carried out at ambient temperature conditions. The bottom pressure (50 psi) is recorded, and the pressure versus time profile (not shown) is recorded. A completely blocked shale sample may show no change of the bottom pressure over time, but typically bottom pressure may increase over time until equilibrium is reached. The time it takes before pressure equilibration happens, may be used as a measurement of the sealing properties of the fluid in question. The SMT was used to assess the effects of the PHA latex polymers as described herein in terms of their abilities to block micro fractures in shale and stopping water ingress, thereby retaining wellbore stability in shale formations.

Two water based fluid systems, EMS-3100 and EMS-3360 were formulated. The initial fluid formulations are summarized in Tables 4 and 5 below.

TABLE 4

1.5 sg EMS-3100

| Product | Function | Conc. g/l |
|---|---|---|
| NaCl brine 1.20 sg | Base fluid | 887 |
| Kla-Hib NS | Inhibitor | 80 |
| Trol FL | FL agent | 15 |

TABLE 4-continued 1.5 sg EMS-3100

| Product | Function | Conc. g/l |
|---|---|---|
| Duovis Plus NS | Viscosifier | 2.5 |
| Barite | Weight material | 440 |
| EMI-2223 | Anti-accrete | 73 |

TABLE 5

1.5 sg EMS-3360

| Product | Function | Conc. g/l |
|---|---|---|
| NaCl brine 1.20 sg | Base fluid | 980 |
| EMI-3192 | Inhibitor | 40 |
| Trol Fl | FL agent | 4 |
| EMI-3172 | Encapsulator | 8.6 |
| Duovis Plus NS | Viscosifier | 1 |
| Barite | Weight material | 441 |
| EMI-1913 | Anti-accrete | 25 |

The first option of a wellbore fluid formulation (as seen in Table 6) used as control for comparison with other formulations includes a conventional latex polymer. Specifically, a synthetic latex product, latex C1, with a low concentration of a non-ionic surfactant was used. EMS-3100 mixed with latex C1 meets the acceptance criteria for technical performance with respect to viscosity, fluid loss control, filter cake adherence, trapped air, cutting hardness and accretion potential in the temperature range from 25° C. to 100° C. In addition, hot rolling up to 100° C. does not have a negative effect on the adhesive properties.

TABLE 6

EMS-3100 fluid formulation with latex C1

| Product | Function | Conc. g/l |
|---|---|---|
| NaCl brine 1.10 sg | Base fluid | 680 |
| Kla-Hib NS | Inhibitor | 80 |
| Trol FL | FL agent | 7 |
| Duovis Plus NS | Viscosifier | 2.5 |
| Barite | Weight material | 557 |
| EMI-2223 | Anti-accrete | 73 |
| Latex C1 | Sealant | 100 |

A PHA latex polymer (Mirel MD08) was mixed with the water based fluid system EMS-3100. Experimental results indicate that the PHA latex MD08 is less efficient as fluid loss additive compared to latex C1, but obtains the same filter cake adherence with proper fluid loss additive package. As seen in Table 7, the PHA latex requires a coalescing agent to obtain acceptable filter cake adhesion at lower temperatures. At 80° C. and above no coalescing agent is needed to achieve acceptable filter cake adhesion.

TABLE 7

PHA latex MD08 with coalescing agent, triacetin, in EMS-3100 AHR at various temperatures

| | | HR & Test Temperature | | | | | | |
|---|---|---|---|---|---|---|---|---|
| | | AHR 40° C. | | | AHR 60° C. | | AHR 80° C. | AHR 100 |
| Trol Fl | g/l | 7.5 | | | 7.5 | | 15 | 15 |
| Lo-Floss | g/l | 7.5 | | | 7.5 | | 7.5 | 7.5 |
| Triacetin | g/l | — | 10 | 25 | 50 | — | 25 | 50 | — | — |

TABLE 7-continued

PHA latex MD08 with coalescing agent, triacetin, in EMS-3100 AHR at various temperatures

| | | HR & Test Temperature | | | | | | | |
|---|---|---|---|---|---|---|---|---|---|
| | | AHR 40° C. | | | | AHR 60° C. | | AHR 80° C. | AHR 100 |
| pH | | 8.8 | 7.6 | 7.3 | 7.3 | 8.8 | 6.9 | 6.9 | 8.3 | 7.1 |
| Viscosity profile: 600/3 rpm ratio | | 13 | 13 | 13 | 13 | 11 | 11 | 10 | 10 | 10 |
| HTHP fl.l. Adherence | ml | 5 | 5.5 | 5 | 5 | 10 | 9 | 11 | 7 | 7 |
| AHR 60 g MD08 Adherence | | Low | Low | Med/Strong | Med/Strong | Low | Med/Strong | Med/Strong | Med/Strong | Med/Strong |
| AHR 100 g MD08 | | Low/Med | Low/Med | Med/Strong | Med/Strong | Med | Med/Strong | Med/Strong | Med/Strong | Med/Strong |

PHA Latex in EMS-3360 HPWBM

Initial testing of MD08 in the EMS-3360 system showed that the same filter cake adherence prior to hot rolling as in the EMS-3100 system is obtained when the concentration of MD08 is increased to 50 g/l. After hot rolling, the filter cake adherence drops to low/medium. Several adjustments of the fluid formulations have been evaluated in order to improve accretion and filter cake adhesion target AHR at 80° C., as seen in Table 8. Replacing anti-accrete EMI-1913 with EMI-2223 increases accretion and slightly reduces filter cake adherence. Removing encapsulator EMI-3172 also increases accretion and reduces adherence. The drilling fluid appears grainy and flocculated, and separates at room temperature. Removing anti-accrete EMI-1913 increases accretion, but improves filter cake adherence AHR. Increasing encapsulator EMI-3172 in the fluid without anti-accrete improves accretion insignificantly.

TABLE 8

Accretion and adherence at 80° C.

| Product | Function | EMS-3360 No MD08 | EMS-3360 + MD08 | New Anti-accrete | No encap. | No anti-accrete | |
|---|---|---|---|---|---|---|---|
| EMI-3192 | Inhibitor | 40 g/l | 40 g/l | 40 g/l | 40 g/l | 40 g/l | 40 g/l |
| EMI-2223 | Anti-accrete | — | — | 73 g/l | — | — | — |
| EMI-1913 | Anti-accrete | 25 g/l | 25 g/l | — | 25 g/l | — | — |
| EMI-3172 | Encapsulator | 8.6 g/l | 8.6 g/l | 8.6 g/l | — | 8.6 g/l | 12 g/l |
| MD08 | Seal | — | 50 g/l | 50 g/l | 50 g/l | 50 g/l | 50 g/l |
| Tributyrin | Coalescing | — | 25 g/l | 25 g/l | 25 g/l | 25 g/l | 25 g/l |
| Accretion | | 29 | 15 | 42 | 30 | 28 | 25 |
| Adherence BHR | | No/Low | Med/Strong | Medium | Low/Med | Med/Strong | Med/Strong |
| Adherence AHR | | No/Low | Low/Med | — | Grainy Separated | Med | Med |

Three fluid formulations containing a PHA latex polymer (MD08), A, B and C, with overall good performance were selected for complete fluid performance evaluation, as seen in Table 9 below.

TABLE 9

Optimized EMS-3360 formulations

| Product | Function | Unit | A | B | C |
|---|---|---|---|---|---|
| EMI-3192 | Inhibitor | g/l | 40 | 40 | 40 |
| Trol FL | FL additive | g/l | 4 | 15 | 15 |
| Lo-Floss | FL additive | g/l | — | — | 7.5 |
| EMI-3172 | Encapsulator | g/l | 8.6 | 8.6 | — |
| EMI-2223 | Anti-accrete | g/l | — | — | 73.3 |
| EMI-1913 | Anti-accrete | g/l | 25 | — | — |
| MD08 PHA latex | Seal | g/l | 80 | 50 | 30 |
| Tributyrin | Coalescing | g/l | 40 | 25 | 25 |

As seen in Table 10, the base fluids achieve medium to strong filter cake adherence after hot rolling at both 40 and 80° C. Fluid A has a steep viscosity profile and insufficient HTHP fluid loss control AHR 80° C. Fluid B has a relatively steep viscosity profile and good fluid loss control. Fluid C has a good viscosity profile, as well as a good fluid loss control.

TABLE 10 pghcm1 Base fluid viscosity and fluid loss

| | | Test conditions | | | | | |
|---|---|---|---|---|---|---|---|
| | | AHR 16 hrs @ 40° C. | | | AHR 16 hrs @ 80° C. | | |
| Parameter | Target | A | B | C | A | B | C |
| 600 rpm 50° C. | — | 138 | 153 | 118 | 130 | 144 | 115 |
| 300 rpm 50° C. | — | 89 | 104 | 78 | 87 | 97 | 77 |
| 3 rpm 50° C. | — | 14 | 12 | 12 | 9 | 12 | 13 |
| PV | — | 49 | 49 | 40 | 43 | 47 | 38 |
| 600/3 rpm ratio | <12 | 9.9 | 12.8 | 9.8 | 14.4 | 12 | 8.8 |
| API FL | <4 ml | 1 | 0.5 | 1.2 | 1 | 1 | 1 |
| HTHP FL 10 μm 2 hrs | <10 ml | 5.5 | 4.5 | 4 | 12.5 | 7.5 | 8.5 |
| Adherence | Medium/Strong | Medium/Strong | (Medium) Strong | Medium/Strong | Medium/Strong | Medium/Strong | Medium/Strong |

As seen in Table 11, static sag testing results show that fluids A, B and C obtain low separation and good static sag values after both 1 and 3 days ageing at 40° C. At 80° C. all fluids have a drop in pH and achieve unacceptable sag values. For fluid A, the pH is as low as 6.6 after 3 days at 80° C., and in addition the fluid show very high fluid separation (28 vol. %).

TABLE 11

Static Sag

| | | Test conditions | | | | | |
|---|---|---|---|---|---|---|---|
| | | AHR 16 hrs @ 40° C. | | | AHR 16 hrs @ 80° C. | | |
| Parameter | Target | A | B | C | A | B | C |
| 1 day static sag, ΔMW | <0.15 sg | 0.01 | 0.07 | 0.12 | 0.37 | 0.36 | 0.53 |
| 3 days separation, free fluid on top | 15 vol % | 1 | 0 | 0 | 28 | 1 | 1 |
| 3 days static sag, ΔMW | <0.30 sg | 0.08 | 0.11 | 0.15 | 0.52 | 0.58 | 0.62 |
| pH @ 3 days static | 8.5-9.5 | 9 | 9.1 | 9 | 6.6 | 7.1 | 8 |

Inhibition towards highly dispersive Arne clay shows that fluid A has full recovery and a cuttings hardness value of 110 torque/inch pounds, but unacceptable 44% accretion at 80° C. (as seen in Table 12). Fluid B has acceptable accretion and recovery AHR at 40° C., but slightly low cuttings hardness value (80 torque/inch pounds). At 80° C. accretion is slightly high (28%) for fluid B and it is on the borderline to be considered a high performance fluid with respect to cuttings hardness and recovery. Recovery is 90% and the content of small particles<2 mm is as high as 13%, which clearly show degradation and dispersion of the clay. Fluid C has very good inhibition level at both temperatures tested. The fluid achieves 100% recovery, accretion at 15-17% and cuttings hardness at 130 torque/inch pounds. The clay chippings are angular, firm and hard after ageing (not shown).

TABLE 12

Inhibition towards Arne clay

| | | Test conditions | | | | | |
|---|---|---|---|---|---|---|---|
| | | AHR 16 hrs @ 40° C. | | | AHR 16 hrs @ 80° C. | | |
| Parameter | Target | A | B | C | A | B | C |
| Accretion | <20% | 18 | 17 | 17 | 44 | 28 | 15 |
| Recovery | >90% | 100 | 98 | 100 | 100 | 90 | 100 |
| Cuttings hardness | >80 τ/in lbs | 110 | 80 | 130 | 110 | 80 | 130 |

Contamination tolerance has been tested as a worst case scenario without any pre-treatment as per standard procedure towards 100 g/l solids, 10 vol % seawater and 10 ppb cement. Hymod Prima Clay (HPC) has been used to simulate drill solids. Fluid A has good solids tolerance with respect to viscosity and fluid loss control, but filter cake adherence is reduced to unacceptable no/low, as seen in Table 13. Fluids B and C have good solids tolerance with respect to viscosity and fluid loss, but a filter cake adherence at "low/medium" at 80° C. is slightly low. The HPC contamination test procedure is a worst case scenario as the solids are added to the drilling fluid without subsequent dilution to specified MW, 1.54 sg versus 1.50 sg. Previous data has indicated that the concentration of latex and coalescing agent do not need to be increased for HPC contaminated samples up to MW of 1.4 sg. For solids contaminated fluids with MW higher than 1.4 sg the filter cake adherence may be improved by increasing the concentration of MD08 and tributyrin.

TABLE 13

Solids Contamination tolerance

| | | Test conditions | | | | | |
|---|---|---|---|---|---|---|---|
| | | AHR 16 hrs @ 40° C. | | | AHR 16 hrs @ 80° C. | | |
| Parameter | Target | A | B | C | A | B | C |
| 600 rpm | — | 157 | 177 | 151 | 132 | 158 | 141 |
| 3 rpm | — | 14 | 15 | 15 | 11 | 17 | 15 |
| API FL | <6 ml | 1.8 | 1.5 | 0.8 | 1.8 | 1.8 | 1.2 |
| HTHP FL | <15 ml | 5 | 5 | 4 | 12.5 | 7.5 | 8 |
| Adherence | Medium | No/Low | Med/Strong | Medium | No/Low | Low/Med | Low/Med |

Fluid A has good seawater tolerance with respect to viscosity and fluid loss control, but slightly low filter cake adherence (low/medium) AHR at 80° C., as seen in Table 14. Fluids B and C have good seawater contamination tolerance and meet target values for viscosity, fluid loss and filter cake adherence at both temperatures tested.

TABLE 14

Seawater Contamination tolerance

| | | Test conditions | | | | | |
|---|---|---|---|---|---|---|---|
| | | AHR 16 hrs @ 40° C. | | | AHR 16 hrs @ 80° C. | | |
| Parameter | Target | A | B | C | A | B | C |
| 600 rpm | — | 107 | 133 | 103 | 90 | 112 | 82 |
| 3 rpm | — | 8 | 9 | 11 | 5 | 12 | 7 |
| API FL | <6 ml | 1.2 | 1.2 | 0.8 | 1.4 | 1.1 | 1.2 |
| HTHP FL | <15 ml | 6 | 5 | 5 | 12.5 | 10 | 9.5 |
| Adherence | Medium | Med/Strong | Med/Strong | Med/Strong | Low/Medium | Medium | Medium |

The contamination tolerance is tested as a worst case scenario, and 10 ppb cement contamination is high without any pre-treatment of the fluids. Fluid A has low cement contamination tolerance with respect to fluid loss control, as shown in Table 15. API and HTHP fluid loss is as high as 21 ml and 37 ml AHR at 80° C. Fluid B has relatively good cement contamination tolerance with respect to viscosity and fluid loss. Fluid C has good cement contamination tolerance with respect to both viscosity and fluid loss. Filter adherence was evaluated for the three fluids.

TABLE 15

Cement Contamination tolerance

| | | Test conditions | | | | | |
|---|---|---|---|---|---|---|---|
| | | AHR 16 hrs @ 40° C. | | | AHR 16 hrs @ 80° C. | | |
| Parameter | Target | A | B | C | A | B | C |
| 600 rpm | — | 97 | 140 | 104 | 126 | 165 | 104 |
| 3 rpm | — | 6 | 12 | 9 | 17 | 30 | 9 |
| API FL | <6 ml | 4 | 2.5 | 1 | 21 | 6.8 | 1.2 |
| HTHP FL | <15 ml | 17 | 8.5 | 7 | 37 | 13 | 10 |
| Adherence | — | No/Low | Low/Medium | No/Low | No/Low | Low/Medium | Medium |
| pH | <10 | 10.7 | 10.9 | 10.3 | 9.2 | 9.4 | 9.4 |

Disc Adhesion Strength Test

This test is used for a quantitatively evaluation of the adhesive properties of the filter cake. To ensure reproducibility, work was also carried out to formulate the latex containing fluid such that the filter cake thickness was comparable to the fluid without latex. This was done to eliminate "edge effects", as it was hypothesized that the deeper the disc was buried in the filter cake, the stronger the resulting adhesive force would be.

Berea discs are used as these cores are readily available and are able to be cut precisely without chipping or fracturing. The filtration medium used in the HTHP cells was also Berea to better simulate a realistic wellbore condition, as in contrast to using ordinary ceramic discs. Experimental procedure: 60 minutes filtration in HTHP cell, 100° C., 500 psi (development of filter cake); cell opened and disc is placed gently on top of filter cake; 60 minutes additional filtration at same temperature and pressure as in the first stage; cell opened and placed quickly into pull force measuring apparatus without cooling; pull force is measured.

Figure 2:
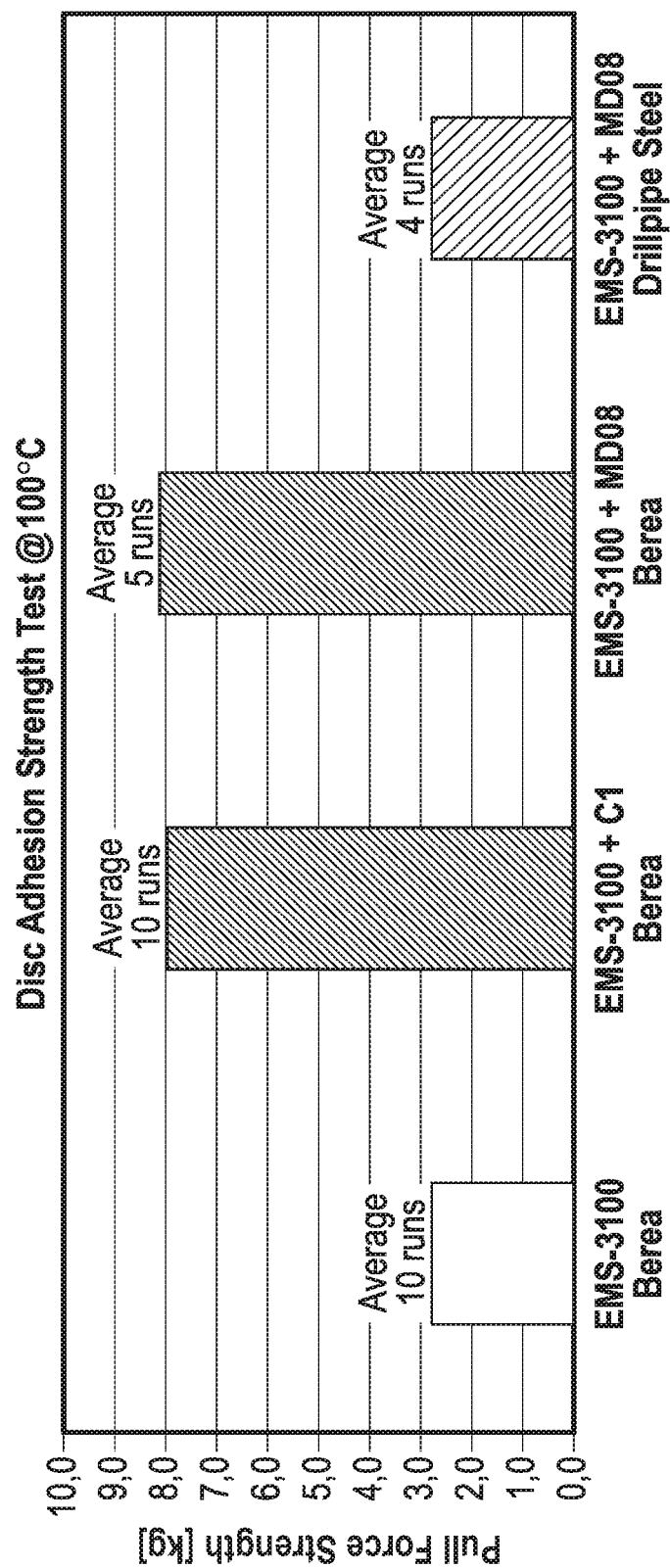
FIG. 2 illustrates disc adhesion strength test results, according to the present embodiments.

As can be seen from the averaged data shown in Table 16 and FIG. 2, both the latex C1 and the PHA latex MD08 provides an increased adhesive force compared to the fluid without latex. The pull force to failure is 2.9 times stronger, or nearly triple the force needed to separate the disc from the filter cake compared to the fluid without latex. The ultimate strength in Pascal is calculated by converting the pull force to Newton and dividing by the area of the Berea disc.

The adhesive force between Berea disc and disc of drill pipe steel for filter cake with MD08 is not stronger than the adhesive force between two Berea disc and a filter cake without latex. Based on these data it is assumed that there should be no issues with stuck pipe due to adhesive strength of filter cake.

TABLE 16

Pull force to failure. Base fluid VS Latex fluid (no bridging particles in the fluids)

| Fluid | Disc media | Pull force to failure (kg) | Ultimate Strength (Pa) |
|---|---|---|---|
| EMS-3100 base fluid | Berea/Berea | 2.8 | 24 000 |
| EMS-3100 + 100 g/l Latex C1 | Berea/Berea | 8.0 | 69 000 |
| EMS-3100 + 100 g/l PHA latex MD08 | Berea/Berea | 8.1 | 70 000 |
| EMS-3100 + 100 g/l PHA latex MD08 | Berea/Drill Pipe Steel | 2.8 | 24 000 |

Shale Membrane Test (SMT)

Figure 3:
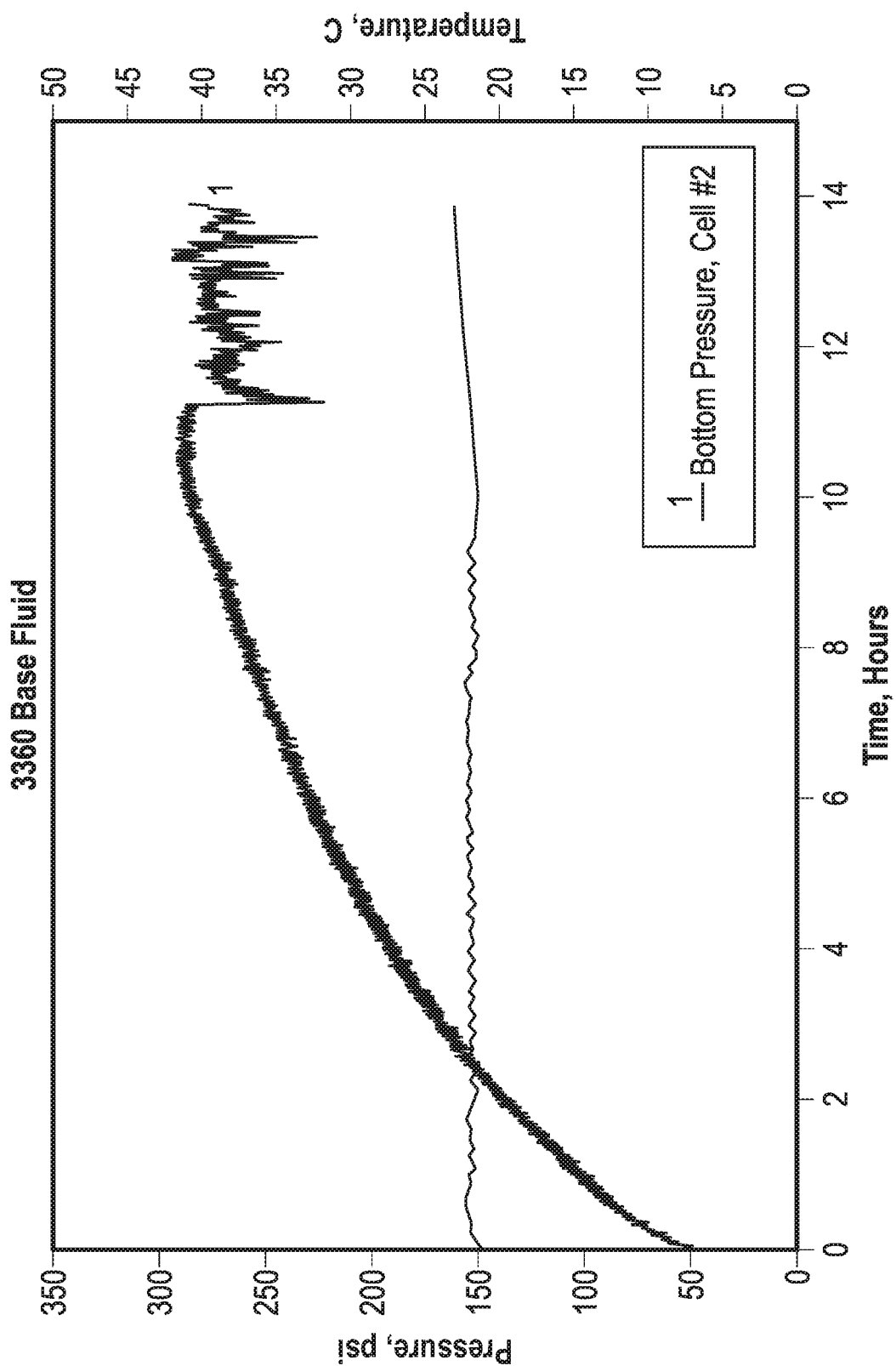
FIGS. 3 and 4 illustrate SMT data, according to the present embodiments.
Figure 4:
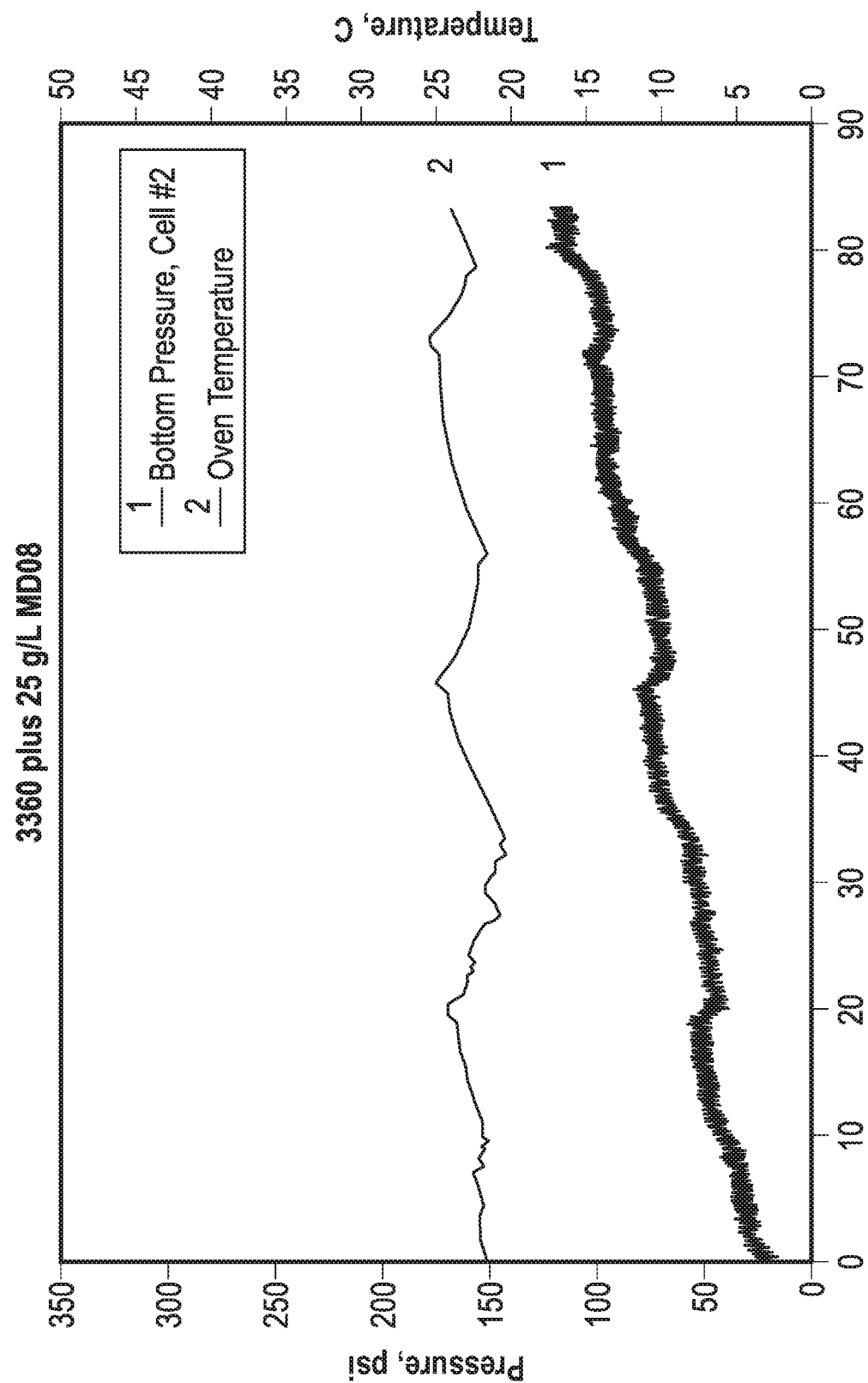

The tests were run on micro-fractured Marcellus shale at ambient temperatures and 250 psi differential pressure. The fluid system was formulated with 1.10 sg NaCl brine. Referring now to FIG. 3, FIG. 3 shows that in the EMS-3360 system, bottom pressure stabilization is observed after approximately 10 hours. Upon addition of 25 g/l of MD08 in the EMS-3360 system, the bottom pressure is seen to be rising steadily over time, but even after 80 hours, pressure is less than 50% of the expected equilibrium pressure, as seen in FIG. 4. Extrapolating the curve would give an approximate equilibration time of more than 160 hours, compared to the EMS-3360 base itself (10 hours).

HSE

The environmental authorities regulate discharge of drilling chemicals with a yellow or green category to sea. The classification scheme is based on aquatic biodegradation, toxicity and bioaccumulation tests. Red category products, as for instance several products in OBM, are not allowed to discharge and will need to be shipped onshore for cuttings waste treatment.

Figure 5:
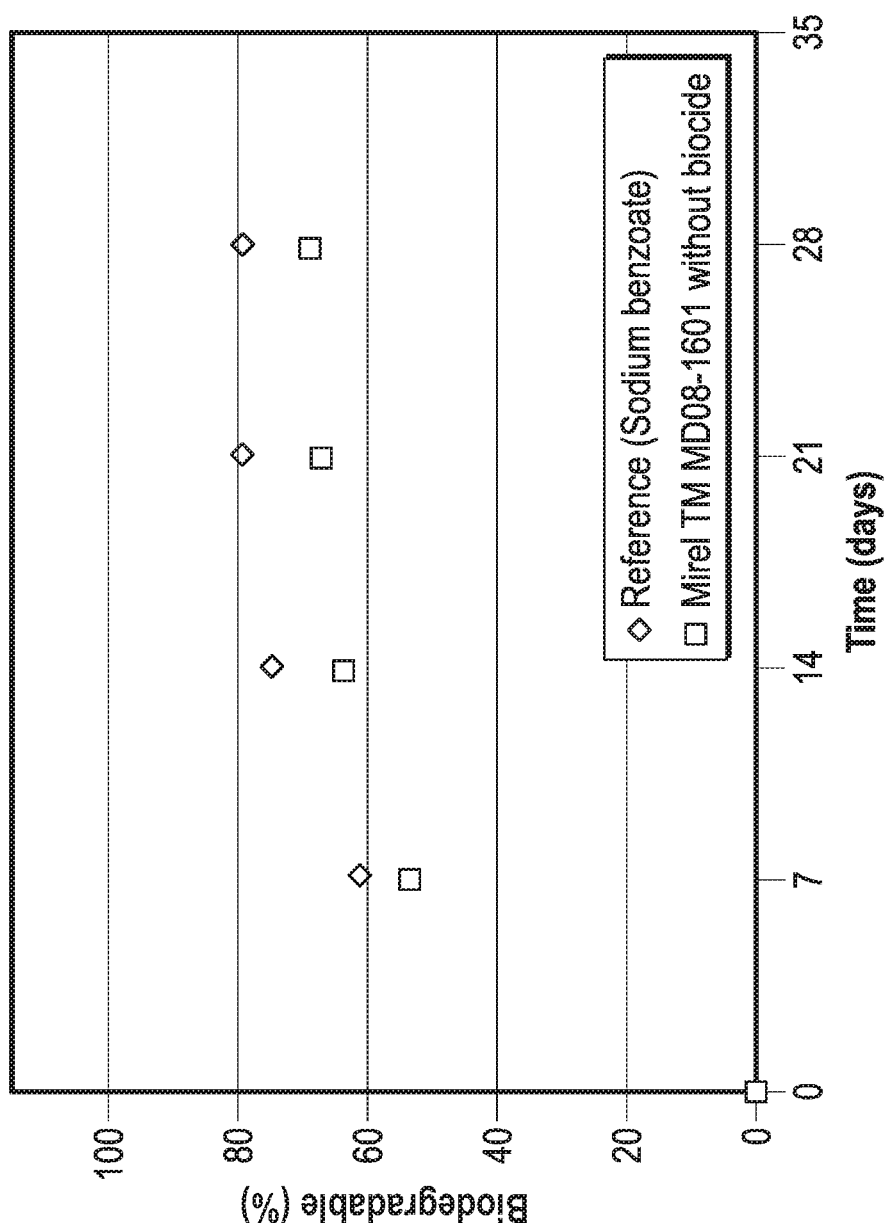
FIG. 5 depicts OECD 306 biodegradation screening test results, according to the present embodiments.

The currently selected PHA latex product is expected to fall in the yellow North Sea category. Screening tests performed on the biocide-free product has demonstrated a biodegradation over 60% in the OECD 306 test, as shown in FIG. 5. This is very high for a polymer of this molecular weight (2-300 K amu). The proposed mechanism behind this very high biodegradation is speculated to be due to the fact that the PHA-latex is produced by bacteria, and that bacteria and enzymes present in the OECD 306 test are well "tuned" to degrade this product. The high total surface area of the latex particles is also believed to play a role. Screening of the toxicity on algae has also been performed. The screening test used 148 mg of PHA per litre, and no toxic effects were observed. Bioaccumulation has not been specifically tested, but is not considered to pose any problems as the molecular weight of the PHA polymer is far beyond the 700 amu limit, and would not be likely to be able to pass through any biological membranes.

The biodegradation testing and toxicity testing has been carried out on biocide free PHA latex. To preserve the product, a biocide may be added, as the product is easily attacked by microorganisms. The biocide would need to fall in the NS yellow category. Two likely biocide candidates for this use are glutaraldehyde and Bodoxin AE.

The optimized EMS-3360 fluid formulation with PHA latex MD08 and tributyrin as coalescing agent meet the required performance criteria with respect to viscosity, pH, trapped air, fluid loss, filter cake adhesion, contamination tolerance and inhibition. The specifications are met both prior and after hot rolling at 40° C. and 80° C., hence the latex can be continuously present in the drilling fluid during circulation in accordance to the main objectives. The recommended PHA concentration is 30 g/l and in addition 25 g/l tributyrin is required for activation at low temperatures. According to the test results the fluid with PHA MD08 and tributyrin is considered to be a high performance system.

The fluid has high stability and good static sag values after both 1 and 3 days ageing at 40° C., but at 80° C. the fluid has a drop in pH and achieves unacceptable sag values. The PHA latex as described herein forms a mechanically strong filter cake with good adhesion at elevated temperatures. According to the Disc Adhesion Strength Test the pull force to failure is nearly triple the force needed to separate the disc from the filter cake compared to the base fluid. To summarize, the biodegradable MD08 latex provides a mechanically strong seal with efficient hydraulic blocking of micro fractures. The PHA latex and tributyrin mixture has been formulated to activate at low temperatures, hence fabrication of a downhole heat activation tool is not required.

As noted above, the test temperature was set to 100° C. for the initial part of the project. Some of the results obtained at 100° C. are presented below.

Referring now to Table 17, Table 17 presents a comparison analysis of fluid loss and adherence of PHA latex polymer based filter cakes. Three PHA polymers were used, where PHA 1 is Mirel™ 8000 latex (available from Metabolics, MA), PHA 2 is PHA Mirel MD08 and PHA 3 is VersaMer™ PHA (available from PolyFerm Canada, Inc.). Mirel™ 8000 latex, a PHA based biopolymer made by fermentation using renewable carbon based feedstocks, is a 55% suspension of semicrystalline Mirel™ biodegradable resin with a particle size of 1-3 μm and typical viscosity from 300-500 centipoise. VersaMer™ PHA is a biodegradable thermoplastic elastomer made from renewable resources such as sugar and vegetable oil. It is a semicrystalline elastomeric material possessing excellent elongation-at-break, water-resistance, and gas barrier properties. As seen in Table 17, the filter cake formed by PHA 2 has the lowest fluid loss at 100° C., while exhibiting a medium/strong adherence.

TABLE 17

Test results for various PHA based filter cakes

| Latex | PHA 1 | PHA 2 | PHA 3 |
|---|---|---|---|
| Fluid loss (100° C.) | 11 | 8 | 18 |
| Adherence | Medium | Medium/Strong | Low |

A comparison analysis was also performed on filter cakes based on latex C1 and PHA 2. In both cases, the formulations included a plasticizer, as indicated in Table 18, below.

TABLE 18

Comparison analysis of filter cakes prepared using a conventional latex and a PHA latex polymer

| Latex | Latex C1 | | PHA 2 (100° C.) | | |
|---|---|---|---|---|---|
| Plasticizer | 3% Texanol | — | 5% Triacetin | 10% Triacetin | 20% Triacetin |
| Fluid loss 100° C. | 6 | 9 | 9 | 9 | 8 |
| Adherence | Strong | Medium/ Strong | Medium/ Strong | Medium/ Strong | Medium/ Strong |

As seen in Table 18, the fluid loss control and the adherence properties of the PHA latex polymer based filter cake are comparable with those of the conventional latex-based filter cakes. Therefore, PHA latex polymers as described herein may be effectively used as replacements of the conventional latex polymers which are not biodegradable.

Advantageously, embodiments of the present disclosure may provide wellbore fluids and methods of using such fluids that include an aqueous base fluid and an environmentally friendly PHA latex polymer. The use of an environmentally friendly PHA latex polymer in the wellbore fluids of the present disclosure advantageously allows for improving the wellbore consolidation, reducing fluid loss control, while maintaining a favorable environmental rating. For example, the latex polymer as described herein may provide reduction of losses, blockage of fluid invasion into micro-fractured shale, strong adhesion of the filter cake to a formation and increased mechanical strength of the filter cake. In addition, acceptance criteria for a high-performance water based drilling fluid are met. As described above, the latex polymer may be formulated with an additive enabling activation down to ambient temperatures, hence a downhole heat activation tool may not be required. The fluids disclosed herein have good temperature stability and withstand exposure to elevated temperatures and therefore are useful in drilling, completion and working over of subterranean oil and gas wells.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method, comprising:
emplacing a wellbore fluid into a wellbore through an earthen formation, the wellbore fluid comprising:
an aqueous base fluid; and
a plurality of particles of a polyhydroxyalkanoate latex polymer having the formula:

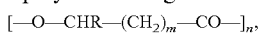

wherein m is a value ranging from 1 to 10, n is a value equal to or less than 20000, and the polyhydroxyalkanoate latex polymer has a molecular weight from about 100 to about 30,000 wherein R is an alkyl radical, wherein the number of carbon atoms in the R radical is equal to or less than 13.

2. The method of claim 1, wherein n ranges from about 100 to about 20000.

3. The method of claim 1, wherein the polyhydroxyalkanoate latex polymer is present in the wellbore fluid in a concentration ranging from 0.1 wt % to 20 wt %.

4. The method of claim 1, wherein the particles of the polyhydroxyalkanoate latex polymer have a particle size distribution d50 of less than 1500μ.

5. The method of claim 1, further comprising a plasticizer.

6. The wellbore fluid of claim 1, further comprising a coalescing agent.

7. The method of claim 1, wherein the wellbore fluid is a drilling fluid.

8. The method of claim 1, further comprising:
forming a filter cake in the wellbore.

9. The method of claim 1, wherein the aqueous base fluid is selected from the group consisting of fresh water, sea water, brine, mixtures of water and water soluble organic compounds, and mixtures thereof.

* * * * *